United States Patent [19]
Lermann et al.

[11] Patent Number: 5,864,717
[45] Date of Patent: Jan. 26, 1999

[54] PHOTOGRAPHIC ROLL-FILM PACK WITH A PICTURE-TAKING LENS

[75] Inventors: Peter Lermann, Weyarn-Nahring; Dieter Engelsmann, Unterhaching, both of Germany

[73] Assignee: Agfa-Gevaert AG, Germany

[21] Appl. No.: 799,359

[22] Filed: Feb. 14, 1997

Related U.S. Application Data

[63] Continuation of Ser. No. 423,711, Apr. 17, 1995, abandoned.

[30] Foreign Application Priority Data

Apr. 28, 1994 [DE] Germany .......................... 44 14 854.2

[51] Int. Cl.$^6$ .................................................. G03B 17/02
[52] U.S. Cl. ............................................. 396/6; 396/535
[58] Field of Search ........................................ 396/6, 535

[56] References Cited

U.S. PATENT DOCUMENTS

| | | |
|---|---|---|
| 4,041,507 | 8/1977 | Ko et al. . |
| 4,766,451 | 8/1988 | Fujimura et al. . |
| 4,797,697 | 1/1989 | Heuer et al. . |
| 4,804,987 | 2/1989 | Arai . |
| 4,882,600 | 11/1989 | Van de Moere . |
| 5,325,139 | 6/1994 | Matsumoto . |
| 5,343,265 | 8/1994 | Oi et al. . |
| 5,361,111 | 11/1994 | Yamashina et al. . |

FOREIGN PATENT DOCUMENTS

| | | |
|---|---|---|
| 0 465 897 | 1/1992 | European Pat. Off. . |
| 2 334 127 | 7/1977 | France . |
| 37 21 556 | 1/1988 | Germany . |
| 42 22 356 | 1/1993 | Germany . |
| 2 235 984 | 3/1991 | United Kingdom . |

*Primary Examiner*—David M. Gray
*Attorney, Agent, or Firm*—Connolly & Hutz

[57] ABSTRACT

A photographic roll-film pack, comprised of a light-proof core case with roll-film, with a photographic shutter, film advance means with manual control, a picture counter, a shutter-release device and apertures and/or lenses of a picture-taking lens and/or viewfinder defining optical beam paths, with a covering for the core case which leaves uncovered at least one manual control, is designed so that the covering is formed by a protective case (11, 12), enclosing the core case (1, 2), which is composed of shells (11, 12) of essentially rigid plastics which is at least transparent in the areas of apertures and/or lenses of a picture-taking lens and/or viewfinder defining optical beam paths. The roll-film pack is thereby protected against moisture, dirt and damage, but can still be manufactured cost-effectively using automated production and it can be re-assembled following removal of an exposed film.

25 Claims, 2 Drawing Sheets

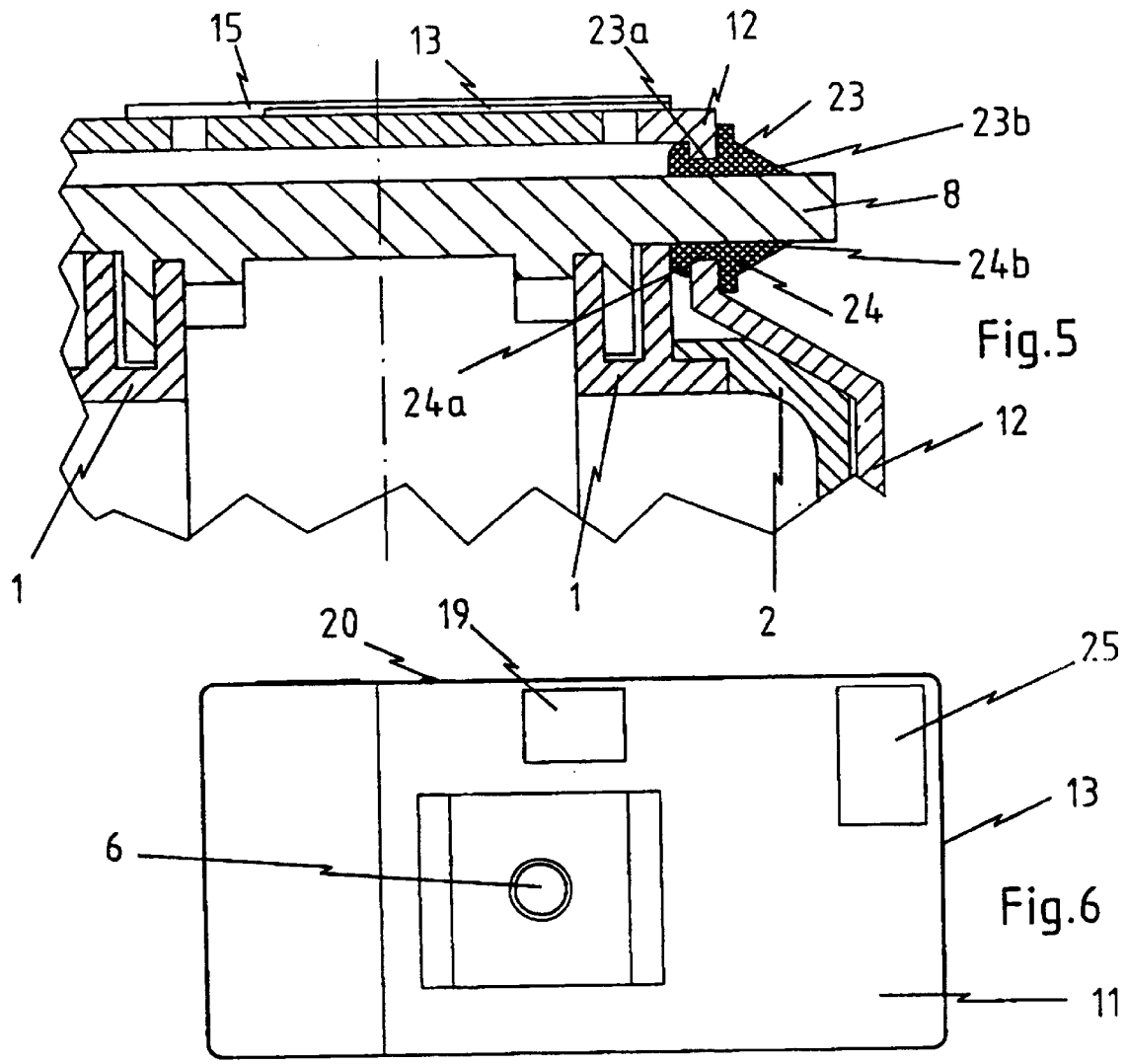
Fig.5
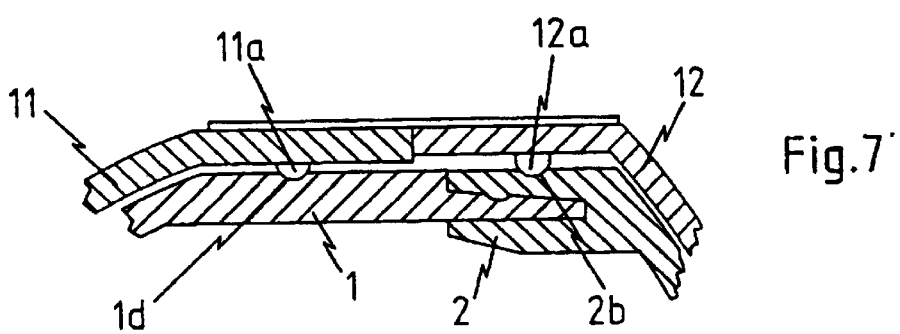
Fig.6
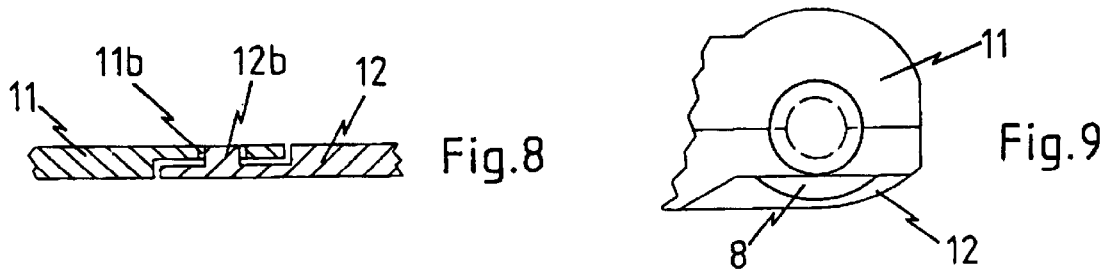
Fig.7
Fig.8
Fig.9

PHOTOGRAPHIC ROLL-FILM PACK WITH A PICTURE-TAKING LENS

This application is a continuation of Ser. No. 08/423,711 filed Apr. 17, 1995, now abandoned.

The invention concerns a photographic roll-film pack according to the main clause of Claim 1.

Photographic film packs of similar type are already known in several variants, for example through commercially available packs or through the documents DE-OS 3 716 812, DE-OS 3 721 556, DE-OS 3 733 403 or U.S. Pat. No. 4,882,600. In these variants, an outer covering is generally composed of printed cardboard and may also comprise a viewfinder lens or it is of waterproof construction, being composed of transparent plastics, so that the film pack can also be used as an underwater camera. The latter type must be absolutely watertight.

Film packs of the above-mentioned type are now used primarily at excursion destinations such as at the sea, on the sand, at festivals and picnics on green spaces, at sporting and similar events where they are sold at on-site stands and when people have not brought their own valuable cameras, either because of their greater weight or because they have been forgotten or because they fear theft or damage by moisture, waves, sand or playing children, who could smear the film packs with chocolate, ice-cream, etc. Although the films in known underwater film packs are protected against water, sand and smearing by small children, their complete watertightness renders them more expensive than is necessary for normal use. On the other hand, the other known film packs with cardboard coverings have no protection against sand, spray water or soiling. In addition, the cardboard covering, which leaves a large part of the core case uncovered, can be easily ripped open by e.g. playing children, which generally renders the whole film pack inoperable. As a result, the core case frequently cannot be reused by the manufacturer following removal of the film.

The object of the invention therefore is to create, by simple means, a film pack of the above-mentioned type, without achieving water-tightness, such that it cannot be harmed by external influences such as sand, spray water, playing children or dirt and such that mechanical destruction is scarcely possible without the application of considerable force but such that, with regard to the subsequent processing of the exposed roll-film, it can be opened and reassembled and reloaded with a new film without difficulty.

This object is achieved, according to the invention, by the characteristics of the main claim. Further advantageous embodiments of the invention are indicated in the sub-claims.

The rigid plastic shells of the covering give the user the feeling of a solid camera. Although the strip is flexible and elastic, it is nevertheless solid, and is not perceived as a connection between the two shells which can be easily torn off, particularly when it projects over the shell faces and includes control elements such as the shutter-release, but as a solid component of the film pack, so that even children are hardly tempted to tear it off. The actual film pack with all moving functional elements, however, is protected inside the covering, so that it cannot be affected by potential influences or soiling during games, sports or picnics. This ensures that the core case can be reassembled with new film by the manufacturer and packed into a new or even used protective case as required. The material, production, assembly and recoverability are so favourable that not only do they not adversely affect the cost-effectiveness of the film pack, they actually increase it.

The invention is described in greater detail with reference to drawings, particular advantages of individual embodiments being indicated.

FIG. 5 shows an enlarged section through the opening in the case for the manual film advance control, along the line V—V in FIG. 3.

FIG. 6 is a view of the film pack according to FIG. 1, towards the picture-taking lens.

FIGS. 7 and 8 are enlarged representations of locking or fixing systems for the shells of the protective and core cases.

FIG. 9 is a broken representation of another embodiment of a protective case.

Figure 1:
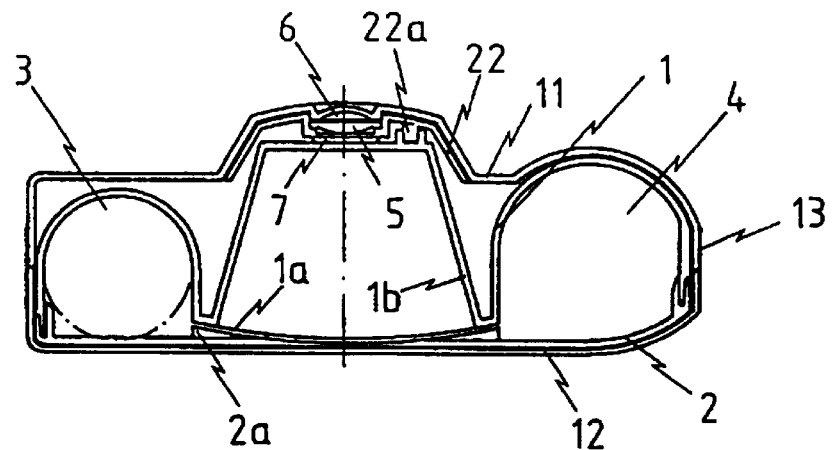
FIG. 1 shows a section through an embodiment of a roll-film pack according to the invention with a protective case.

In the figures, references 1 and 2 indicate a light-proof case, referred to below as the core case, reference 3 indicates a film storage or cartridge space, 4 a film winding space, 1b an image shaft which limits, according to the film format provided, the necessary image angle or beam path between a picture-taking lens 5, 6 and the film path 1a, 2a, and 7 indicates a shutter directly behind the inner objective lens 5. The unexposed film, which is not shown, can be inserted into the film storage space 3 in a cartridge or as a loose film coil, guided through the film path 1a and fixed to a winding reel, not shown, which is connected to a rotatable manual film advance control 8. Film is loaded in the core case 1, 2 by the manufacturer and removed from the case by the manufacturer following exposure. The core case can then be reloaded with film. Accordingly, the core case possesses all camera components necessary for taking photographs, in any known and non-illustrated forms, such as a shutter-release, picture counter and film metering device which stops the film when the manual film advance control is rotated to advance the film by one picture and also, if necessary, an electronic flash unit with the parts necessary for its operation, such as the manual charging control 9. Some of these parts can also be located outside the core case 1, 2. In the embodiment illustrated, the core case is divided into a front main section 1 and a removable back wall 2 with a concave return film path 2a. Other known case configurations are also possible, e.g. division into a closed case with a removable lower section.

In known roll-film packs of this type, the core case is partially enclosed by a printed cardboard cover which leaves the manual controls uncovered. These sales packagings are not protected in any way against damage and are therefore exposed to environmental influences such as fog, rain or sea spray, etc. Equally, the cardboard coverings can also be torn open, by children for example, which then renders the whole film pack unusable if the cardboard covering contains functional parts such as viewfinder windows or lenses. Whereas care is taken with valuable cameras to ensure that they are not handled improperly, this is not the case with the film packs available from stalls at resorts.

In contrast, the roll-film pack according to the invention is protected against all the types of damage described, without being suitable for underwater photography, by the fact that the core case 1, 2 is enclosed by a protective case comprised of shells 11, 12 of transparent, essentially rigid plastics. The two shells 11, 12 can be locked together and/or to the core case 1, 2, fixed together or fastened by means of push-button type or hook-type catches 11a, 12a and 11b, 12b, as shown, as examples only, in FIGS. 7 and 8. They could also be welded or stuck together, so that the seam would have to be cut when the film pack is opened.

Particularly advantageous is a light fixing system in which the shells 11, 12 are actually held together by a strip 13 of flexible, elastic plastic material, disposed over adjoining shell edges. It is expedient, with respect to protection of the film pack against damage and dirt, that the strip 13 should cover one or more and, more advantageously, all manual controls actuated by pressure, such as the shutter release 14 and the manual charging control 9, and that the latter should be operated by pressing parts of the strip 13 specially marked for this purpose by adhesive labels (composed, advantageously, of plastics). It is also possible to avoid the use of adhesive labels if the strip 13 is made from transparent plastics printed, as required, at other points and if the manual controls are conspicuously coloured and easily visible through the strip 13. In the case of stuck-on markings 15, 16 it is advisable, for reasons of security and good appearance, that the open ends of the strip 13 should meet and be stuck or welded below the imposed markings 15, 16 and that the markings 15, 16 should be at least as wide as the strip 13. Another possible embodiment of the strip 13, which is not illustrated because it is easily imaginable, is one in which the elastic, flexible, flat strip is formed as a continuous part, similar to a rubber band, and is temporarily expanded to be drawn over the shells 11, 12 and, due to its elasticity, bears on the shell edges with applied tension, holding them together. Obviously, in the case of all designs with an elastic strip, it is possible to stick the strip to the shells or to fasten it in a manner similar to that in which the shells can be locked together or to the core case.

In the embodiment example shown in FIGS. 1 to 4, the two shells 11, 12, possibly together, form recesses 17, 18 at the locations where a manual control must be operated. The manual charging control 9 projects through the recess 17 and thus lies directly under the strip 13. By contrast, for operation of the shutter-release on the core case 1, which is not visible, a biasing shutter-release arm 11c is formed within the recess 18 with the shutter-release surface 14 on the shell 11, the shutter-release surface 14 being located under the stick-on label 15 and the shutter-release on the core case 1 being actuated by pressing the stick-on label 15 and hence the strip 13 through the biasing shutter-release arm 11c. The shutter-release arm 11c then springs back and re-enables the shutter-release on the core case.

For the purpose of achieving simplicity of assembly of the film pack following loading with film and, if possible automated assembly, at least one of the shells 11, 12 of the protective case has an optically active form at one or more locations which correspond to an optical beam path of the core case 1, 2. This optically active form can be an objective lens part 6, a viewfinder lens 19, a magnifier 20 for the picture number display 10 or a diffusing lens 25 for a built-in electronic flash unit, not illustrated. It is advantageous for all optically active parts which can be positioned in one of the shells 11, 12 to be formed as part of the shell. The objective lens part 6, for example, can be a meniscus which is formed as part of the shell 11 and which, together with another meniscus 5 located on the core case 1, forms the picture-taking lens. This additional lens 5 is located on a part 22 which is fixed to the core case 1 and which can be mounted on the front of the image shaft 1b by means of, e.g., a peg 22a. It has a shell-type exterior form to match the interior form of the shell 11 which carries the meniscus 6. The part 22, together with the lens 5, could be produced as a single piece from transparent plastics and have a colouring, outside the lens 5, which has a function similar to that of a lens mount.

Figure 2:
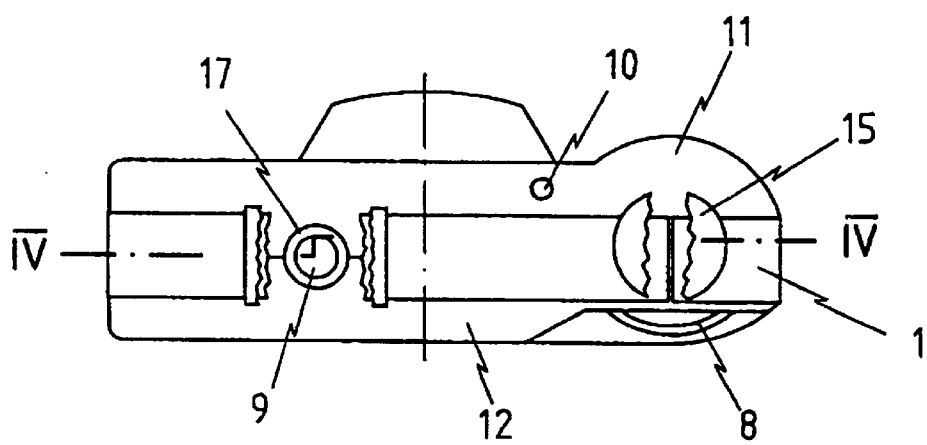
FIG. 2 is a top view of the roll-film pack according to FIG. 1, showing a broken shutter-release marking and a partially broken connecting strip.
Figure 3:
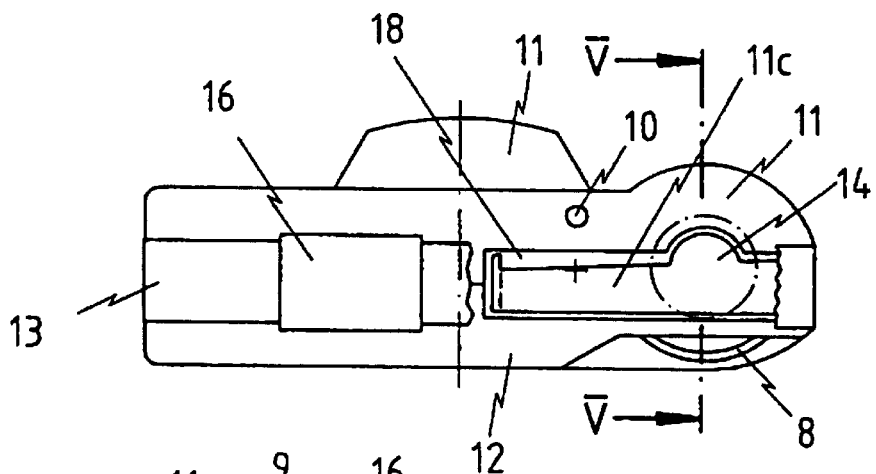
FIG. 3 is the top view according to FIG. 2, with the shutter-release marking removed and with the connecting strip broken above the shutter-release.
Figure 4:
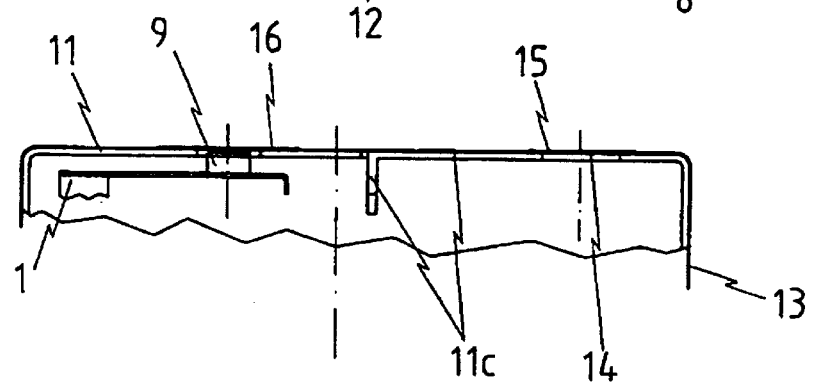
FIG. 4 shows a section through FIG. 2, along the line IV—IV.

Rotatable or movable manual controls such as the manual film advance control 8 which is mounted, so that it can be rotated, on the core case 1 and connected to a film winding reel, obviously cannot be fully enclosed by the protective case 11, 12. A useful arrangement for this is shown in FIG. 5, in which the shell 12 has a slot through which part of the rotatable manual film advance control 8 projects outwards, as also shown in FIGS. 2 and 3. In order that the film pack is nevertheless fully protected in the required manner, elastic sealing lips 23, 24 are mounted on the edges on either side of the slot, overlapping the slot edges with a U-type profile 23a, 24a. Their tapering ends 23b, 24b, which bear on the flat sides of the manual film advance control 8 in the manner of lips, run outwards towards each other in such a way that, in the event of the film pack being subjected to excess internal pressure, e.g. due to heating, air can escape between the sealing lips 23, 24 and the manual film advance control. The slot, together with the sealing lips 23, 24, therefore performs a dual function, that of internal sealing and that of outward ventilation of the interior.

Obviously, the object of the invention is achievable with other designs based on the patent claim. The shells 11, 12 could be stuck or welded together or locked rigidly together so as to be separable with the use of tools, without the strip 13 being positioned over the joints, see FIG. 9. The shells could nevertheless have recesses at all points where pressure-operated manual controls are located. Elastic plaquettes are then pasted over these recesses, thereby sealing them. The inside or outside of the shells 11, 12 of the protective case can be printed as required, outside optical beam paths, or a printed film or similar material can be inserted inside the shells. Also included within the scope of the invention is molding of the shells in multiple colours, particularly the optical parts made from transparent plastics and the other areas of the shell made from opaque plastics. Finally, it is possible for the shells to have a different construction and to be matched together so that their parting plane runs, for example, parallel to the upper or lower side of the film pack.

In a further embodiment of the invention the protective case is open at the position of the picture-taking lens so that the light falls immediately on the picture-taking lens and has not to pass the protective case which is transparent at that position.

Picture-taking lens and protective case are sealed against each other by a suitable seal in order to prevent dirt from getting to the core case.

Optionally the lens has to be replaced when reusing the core case.

We claim:

1. A photographic roll-film pack comprising a light-proof core case with a roll-film removable therefrom, film advance means for advancing said roll-film, a picture-taking lens or an opening aligned with the optical axis of a picture-taking lens, a photographic shutter and at least one manually operable member; and a covering enclosing said core case further having a means to enable manual operation of said at least one manually operable member; wherein said covering comprises first and second shells oppositely arranged with respect to said core case and each comprises a center portion and a circumferential end face portion extending from a plane of said center portion so as to surround said core case and to match in a plane being approximately in the middle between the front wall and the back wall of the camera, and wherein said first and second shells are held together by a strip of flexible material disposed over adjoining end face portions of said shells.

2. The photographic roll-film pack according to claim 1, wherein said circumferential end face portions of said first and second shells match each other so as to commonly form top and side faces of said covering, and said strip is disposed along said top and side faces of said covering.

3. The photographic roll-film pack according to claim 2, wherein said strip is disposed circumferentially on said top and side faces of said covering.

4. The photographic roll-film pack according to claim 3, wherein said strip is formed as a continuous part and is expandable for being drawn over said shells.

5. The photographic roll-film pack according to claim 1, wherein said strip extends along a line intersecting a line of movement of said manually operable member of said core case.

6. The photographic roll-film pack according to claim 1, wherein said manually operable member of said core case is covered by an elastic part of said strip and is actuatable by manually pressing said part of said strip.

7. The photographic roll-film pack according to claim 1, wherein said manually operable member of said core case penetrates a recess commonly formed in said covering by oppositely arranged sections of said circumferential end face portions of said first and second shells.

8. The photographic roll-film pack according to claim 1, wherein one of said first and second shells includes an opening for being penetrated by said film advance means of said core case.

9. The photographic roll-film pack according to claim 1, wherein one of said first and second shells includes an opening at the position of a picture-taking lens of the core case.

10. The photographic roll-film pack according to claim 1, further comprising at least one rotatable or movable manual control means provided at said core case wherein for each of said rotatable or movable manual control means of said core case there is disposed a corresponding slot in said first of second shell or said covering and sealing lips seal the edges of the slot against the rotatable or movable manual control means.

11. The photographic roll-film pack according to claim 1, wherein at least one of said first and second shells forms an optically effective part constituting a picture-taking lens part, a viewfinder lens part, a magnifying lens of a picture number display or a diffuser for an electric flash unit built into said core case.

12. The photographic roll-film pack according to claim 11, wherein said optically effective part is a picture-taking lens part formed by a meniscus which, together with an additional lens mounted in the core case forms the picture-taking lens.

13. The photographic roll-film pack according to claim 12, wherein the additional lens is located on a shell-type part mounted on the core case, which matches the internal form of the shell which comprises the picture-taking lens part.

14. The photographic roll-film pack according to claim 10, wherein the sealing lips taper outwards, towards the manual control means.

15. The photographic roll-film pack according to claim 1, wherein said first and second shells are lined with printed thin card-board or paper or plastics.

16. A photographic roll-film pack comprising a light-proof core case with a roll-film removable therefrom, film advance means for advancing said roll-film, a picture-taking lens or an opening aligned with the optical axis of a picture-taking lens, a photographic shutter and at least one manually operable member; and a covering enclosing said core case further having a means to enable manual operation of said at least one manually operable member; wherein said covering comprises first and second shells are oppositely arranged with respect to said core case and each comprises a center portion and a circumferential end face portion extending from a plane of said center portion so as to surround said core case and to match each other; and wherein said core case has a projecting member, an said circumferential end face portions of said first and second shells commonly form at least one recess arranged so as to be penetrated by said projecting member of said core case.

17. The photographic roll-film pack according to claim 16, wherein said at least one recess commonly formed by said circumferential end face portions of said first and second shells is arranged so as to be penetrated by a manually operable release member.

18. The photographic roll-film pack according to claim 16, wherein said circumferential end face portions of said first and second shells match each other so as to commonly form top and side faces of said covering, and said at least one recess commonly formed by said circumferential end face portions of said first and second shells is arranged at a top face of said covering.

19. The photographic roll-film pack according to claim 16, wherein said first and second shells are provided for being held together by a strip of flexible material disposed over adjoining end face portions of said shells.

20. The photographic roll-film pack according to claim 16, wherein said first and second shells are lined with printed thin card-board or paper or plastics.

21. A photographic roll-film pack comprising a light-proof core case with a roll-film removable therefrom, film advance means for advancing said roll-film, a picture-taking lens or an opening aligned with the optical axis of a picture-taking lens, a photographic shutter and at least one manually operable member; and a covering enclosing said core case further having a means to enable manual operation of said at least one manually operable member; wherein said covering comprises first and second shells each comprises a center portion and a circumferential end face portion extending from a plane of said center portion, said covering having a counterpart portion, and said circumferential end face portion surrounding said core case and to match said counterpart portion of said covering, and wherein said circumferential end face portions of said first and second shells respectively extend in opposite directions to a plane arranged in parallel to and being approximately equal distances from oppositely disposed outer walls of said core case.

22. The photographic roll-film pack according to claim 21, wherein said first and second shells are provided for being held together by a strip of flexible material disposed over adjoining end face portions of said shells.

23. The photographic roll-film pack according to claim 21, wherein said first and second shells are provided for being held together by catch elements.

24. The photographic roll-film pack according to claim 21, wherein said first and second shells are welded together.

25. The photographic roll-film pack according to claim 22, wherein said first and second shells are lined with printed thin card-board or paper or plastics.

* * * * *